United States Patent [19]
Barton

[11] Patent Number: 5,653,146
[45] Date of Patent: Aug. 5, 1997

[54] STEERING COLUMN COUPLING COMPRISING UNIVERSAL JOINTS

[75] Inventor: Laurence George Herbert Barton, Leamington, England

[73] Assignee: The Torrington Company, Torrington, Conn.

[21] Appl. No.: 670,988

[22] Filed: Jun. 28, 1996

Related U.S. Application Data

[63] Continuation of Ser. No. 303,784, Sep. 9, 1994, abandoned.

[30] Foreign Application Priority Data

Oct. 4, 1993 [GB] United Kingdom ............... 9320388

[51] Int. Cl.$^6$ ........................................ B62D 1/19
[52] U.S. Cl. ......................... 74/492; 280/777; 403/54
[58] Field of Search ................. 74/492, 493; 280/775, 280/777; 464/89, 180; 384/125; 403/53, 54

[56] References Cited

U.S. PATENT DOCUMENTS

| | | | |
|---|---|---|---|
| 2,772,649 | 12/1956 | Gensheimer et al. | 464/89 X |
| 3,934,486 | 1/1976 | Becker et al. | 74/492 |
| 4,639,147 | 1/1987 | Schwarz | 384/125 |
| 4,892,002 | 1/1990 | Groat | 74/492 |
| 5,340,220 | 8/1994 | Sprang et al. | 384/125 |

FOREIGN PATENT DOCUMENTS

| | | | |
|---|---|---|---|
| 1557089 | 2/1969 | France . | |
| 379788 | 8/1923 | Germany . | |
| 3442113 | 3/1986 | Germany . | |
| 3723034 | 2/1988 | Germany . | |
| 3 844 251 | 7/1990 | Germany | 74/492 |
| 991 074 | 1/1983 | U.S.S.R. | 464/180 |
| 1085356 | 9/1967 | United Kingdom . | |
| 1449972 | 9/1976 | United Kingdom . | |

OTHER PUBLICATIONS

ATZ Automobiltechnische Zeitschrift, vol. 93, No. 7/8, Jul. 1991, Stuttgart DE pp. 416–425 Karl Peitsmeier, Helmut Patzelt, Arno Röhringer 'Die Lenkanlage der neuen Mercedes–Benz S–Klasse'.

*Primary Examiner*—Charles A. Marmor
*Assistant Examiner*—Mary Ann Battista
*Attorney, Agent, or Firm*—Michael H. Minns

[57] ABSTRACT

A shaft coupling, especially for coupling upper and lower shafts of a vehicle steering column, comprises two yokes interconnected through respective cross members by a pivotable elbow member having two limbs pivoted together. The outer end of each limb is coupled to a respective one of the cross members and the pivot axes of the elbow member and the cross members mounted on the elbow member are parallel to one another. The coupling is suitable for a steering column which is rake and/or reach adjustable and allows, upon impact in a crash situation collapse of the coupling so one limbs contacts the other in order to transmit collapse effort the through the coupling.

13 Claims, 2 Drawing Sheets

5,653,146

STEERING COLUMN COUPLING COMPRISING UNIVERSAL JOINTS

This application is a continuation of application Ser. No. 08/303,784 filed Sep. 9, 1994, now abandoned.

BACKGROUND OF THE INVENTION

This invention relates generally to a shaft coupling and more particularly to shaft couplings for vehicle steering columns.

Hitherto, with rotatable shaft couplings, e.g. for use in vehicle steering columns, there has been a problem of how to obtain satisfactory torque transmission through the coupling if the two ends of the shaft are mounted at an angle to one another.

Furthermore, it is desirable for the coupling to allow collapse of the two ends of the shaft towards one another in the event of a vehicle crash.

The foregoing illustrates limitations known to exist in present shaft couplings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a shaft coupling comprising two yokes interconnected through respective cross members by a pivotable elbow member having two limbs pivoted together, the outer end of each limb being coupled to a respective one of the cross members.

The invention also extends to a vehicle steering column incorporating a shaft coupling essentially as just defined.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
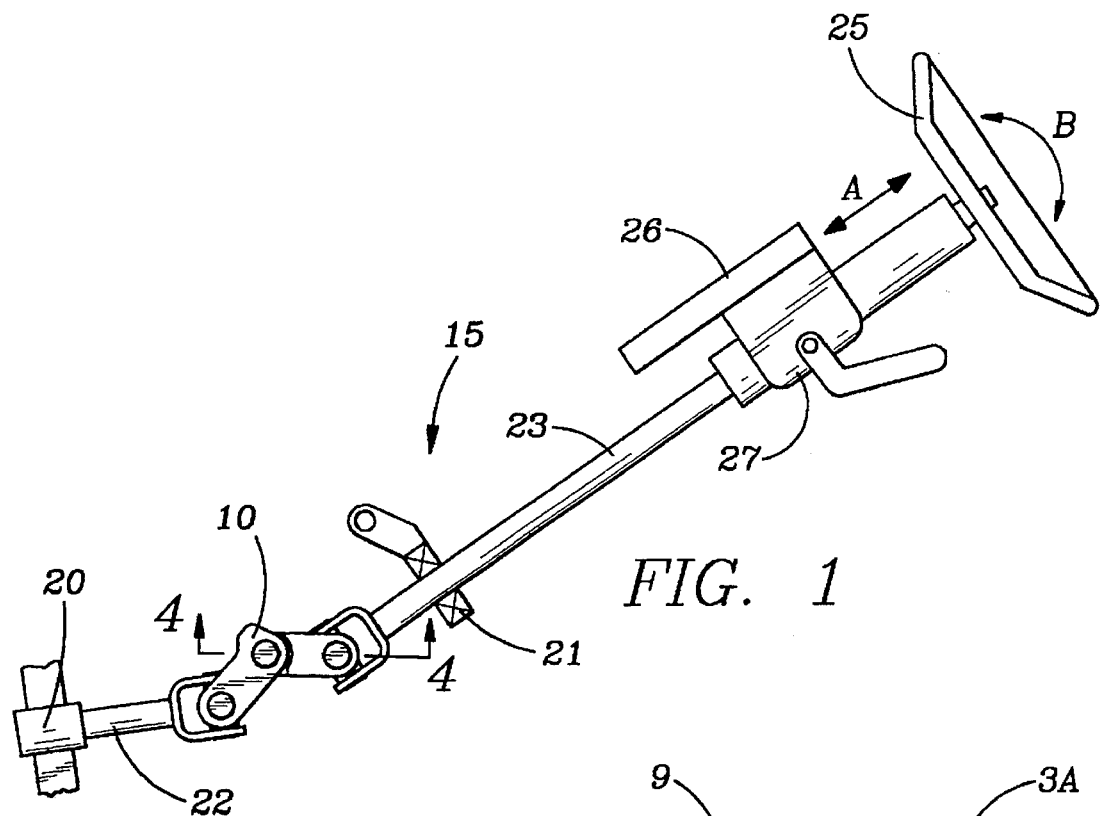
FIG. 1 shows an adjustable vehicle steering column incorporating a shaft coupling of the present invention.

Referring to FIG. 1, the adjustable steering column assembly 15 includes a steering rack 20, a lower, fixed mounting point 21, an upper shaft 23 of the steering column, a steering wheel 25 and an upper fixed mounting point 6 for the steering column assembly 15. The lower shaft 22 and upper shaft 23 are connected by a shaft coupling 10 of the present invention. Steering column assembly 15 is reach and/or rake adjustable as shown by arrows A and B. An adjustment mechanism 27 is provided to reach adjust and/or rake adjust steering column assembly 15.

Figure 2:
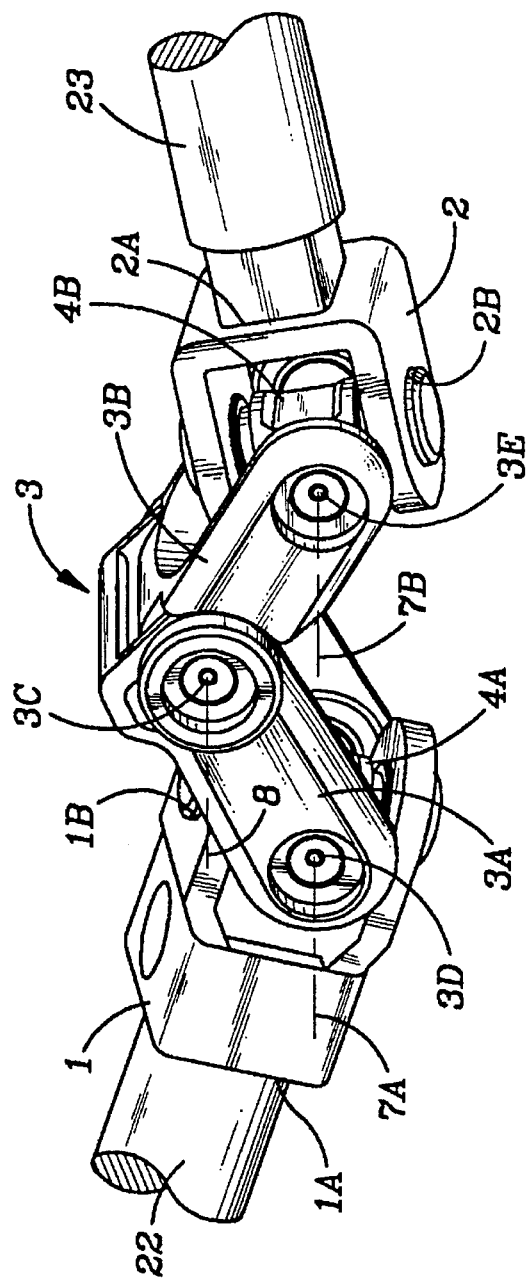
FIG. 2 is a perspective view of the shaft coupling shown in FIG. 1 with the shaft coupling in an open position.

The coupling 10 includes two yokes, 1, 2, into which are to be mounted to the ends of shafts 22, 23. FIG. 2 shows the coupling 10 in a normal operating, open position. The end of the lower shaft 22 is mounted in an aperture 1A of the yoke 1 and the end of the upper shaft 23 is mounted in an aperture 2A of the yoke 2. The yokes 1 and 2 are linked by cross members 4A, 4B, fitted in apertures 1B, 2B, respectively, in the limbs of the yokes, to an elbow member 3.

The elbow member 3 comprises two forked limbs 3A, 3B pivotably mounted together at 3C on a central pivot pin 5. Respective outer ends of the limbs 3A, 3B, i.e. the forked ends, are mounted on pivot points of the respective cross members 4A, 4B at 3D, 3E, on which cross members yokes 1 and 2 are also mounted.

It will be noted that the pivot axes 7A, 7B of the respective crosses 4A, 4B on the elbow member 3 are parallel to one another and are also parallel to the common pivot axis 8 of the two limbs 3A, 3B of the elbow member 3.

Figure 3:
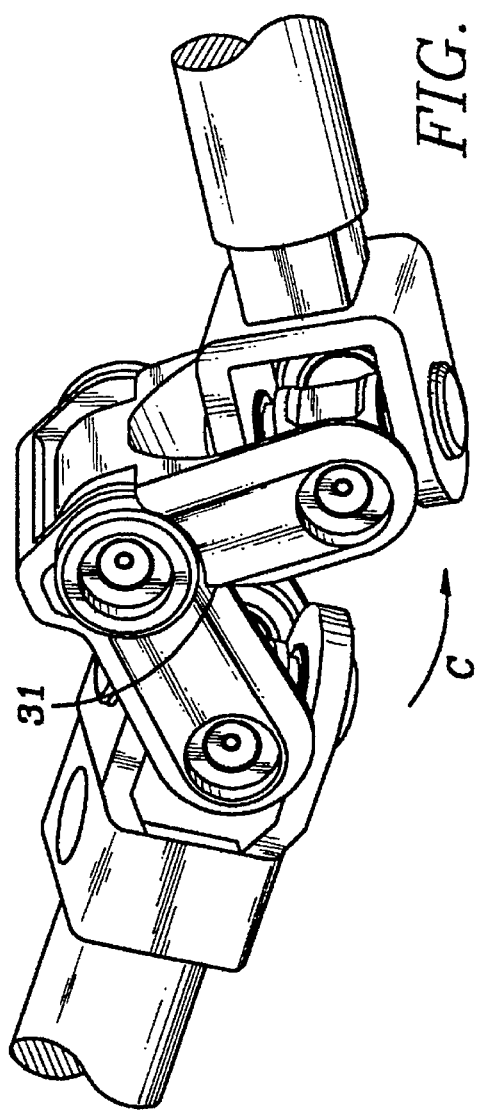
FIG. 3 is a perspective view of the shaft coupling shown in FIG. 1 with the shaft coupling in a collapsed position.

However, in the event of a vehicle crash, one limb, for example the limb 3A, can be pushed by the lower shaft 22 to pivot so far that the limb 3A will close in on the edge walls of the fork of the limb 3B in the direction of the arrow C. FIG. 3 shows the collapsed position of coupling 10. In this condition, crash effort can be transmitted through the shaft coupling 10 to a vehicle crash impact energy absorbing mechanism (not shown). The coupling 10 allows this collapse effort to work through the coupling 10, whatever the angle of the mounting of the lower shaft 22 and the upper shaft 23 of the vehicle steering column 15.

Figure 4:
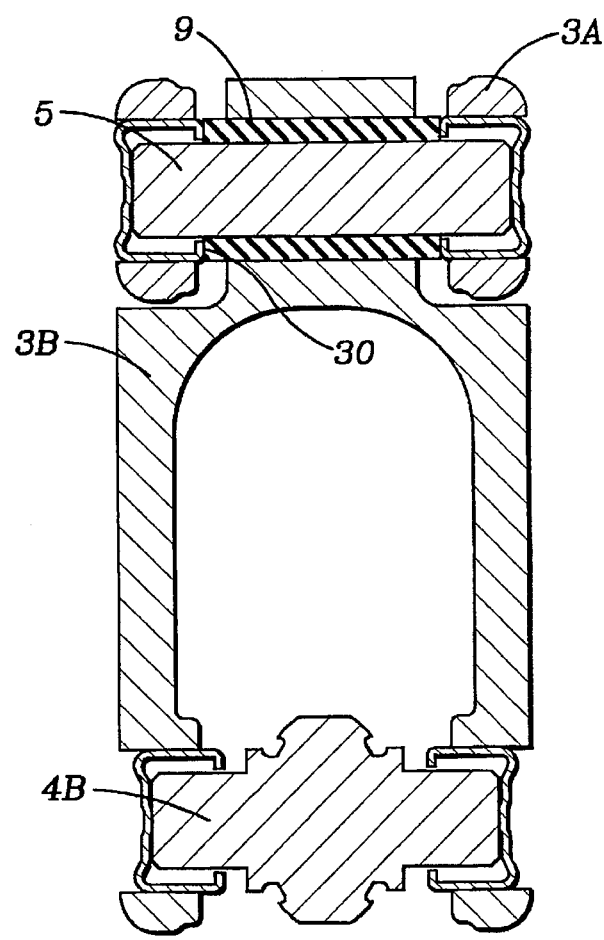
FIG. 4 is a cross-sectional view taken on line 4—4 of FIG. 1, showing the details of the central pivot pin and rubber bush.

A vibration inhibiting isolator can be provided in the coupling 10 and one way of achieving this is by bonding rubber 9 on the central pivot pin 5 linking the two limbs 3A, 3B. FIG. 4 shows the details of the rubber isolation bush 9. This rubber 9 will also assist in centralizing the system during manufacturing and provide a seal at 30 in FIG. 4.

The two cross members 4A, 4B can incorporate built-in seals. Preferably, anti-friction bearings are used on the ends of the cross members 4A, 4B and the central pivot pin 5, as shown in the FIGURES.

During vehicle impact, the limbs 3A, 3B move or collapse into a closed position where the sides of limbs 3A, 3B contact one another (FIG. 3), shown at 31. The present coupling 10 can accommodate 20 mm to 25 mm of movement from an open position to a closed position. The coupling 10 can also accommodate minor differences in the lengths of the upper shaft 23 and the lower shaft 22 due to manufacturing tolerances. The shaft coupling 10 operates in an operating position wherein the limbs 3A, 3B are not co-axial, i.e. an angle less than 180 degrees.

Having described the invention, what is claimed is:

1. A shaft coupling comprising:

two universal joints;

two shafts, each of said universal joints having one of the shafts pivotally connected thereto, the two shafts being not parallel to one another;

a torque transmitting means for pivotally connecting the two universal joints and for transmitting torque from one of said universal joints to the other of said universal joints, the torque transmitting means including two forked limbs and one single central pivot pin through which torque from one of said universal joints is transmitted to the other of said universal joints, each of said universal joints being connected to a first end of a respective one of the forked limbs, second ends of each forked limb being pivotally connected to one another only by the one single central pivot pin, the forked limbs pivoting about a single common axis.

2. A shaft coupling comprising:

a first yoke;

a first shaft connected to the first yoke;

a first cross member pivotally connected to the first yoke;

a second yoke;

a second shaft connected to the second yoke, the first shaft being not parallel to the second shaft;

a second cross member pivotally connected to the second yoke; and a pivotable elbow member having two forked limbs, each of said cross members being pivotally connected to a first end of a respective one of the forked limbs, the pivotable elbow member including one single central pivot pin about which the two limbs pivot, second ends of each forked limb being pivotally connected to one another only by the one single pivot pin, torque being transmitted through the single central pivot pin, the forked limbs pivoting about a single common axis.

3. The shaft coupling according to claim 2, further comprising:

a means for inhibiting vibration transmission from one of said forked limbs to the other of said forked limbs.

4. The shaft coupling according to claim 3, wherein the means for inhibiting vibration transmission includes a rubber bush about the single central pivot pin.

5. The shaft coupling according to claim 3, wherein the means for inhibiting vibration transmission includes a rubber bush bonded to the single central pivot pin.

6. The shaft coupling according to claim 2, wherein the forked limbs pivot from an operating position to a closed position, the angle between the forked limbs in the operating position being less than 180 degrees and the angle between the forked limbs in the closed position being less than the operating position angle.

7. The shaft coupling according to claim 2, wherein the forked limbs contact each other when the pivotable elbow member is pivoted from an open position to a closed position.

8. A vehicle steering column comprising:

an upper shaft;

a lower shaft;

a shaft coupling coupled to the upper shaft and the lower shaft, the shaft coupling including two yokes interconnected through respective cross members by a pivotable elbow member, the pivotable elbow member having two limbs extending therefrom, the pivotable elbow member including one single pivot pin, an outer end of each of said limbs being coupled to a respective one of the cross members, an inner end of each of said limbs opposite the outer end being pivotally connected to one another only by the one single pivot pin, the upper shaft and the lower shaft being coupled to a respective one of the yokes, each of said limbs of the pivotable elbow member being forked so as to embrace and engage two pivot ends of a said respective cross member, the limbs pivoting about a single common axis, the upper shaft not being parallel to the lower shaft.

9. The vehicle steering column according to claim 8, wherein the two limbs pivot about a first axis, one of said cross members pivots about a second axis and the other of said cross members pivots about a third axis, and wherein the first axis, the second axis and the third axis are parallel.

10. The vehicle steering column according to claim 8, wherein a rubber bush is attached to the single pivot pin.

11. The vehicle steering column according to claim 8, wherein the limbs pivot from an operating position to a closed position, the angle between the limbs in the operating position being less than 180 degrees and the angle between the limbs in the closed position being less than the operating position angle.

12. The vehicle steering column according to claim 8, wherein the limbs contact each other when the pivotable elbow member is pivoted from an open position to a closed position.

13. The vehicle steering column according to claim 8, wherein the limbs pivot from an operating position to a closed position, the angle between the limbs in the operating position being less than 180 degrees and the limbs contact each other when the limbs are in the closed position.

* * * * *